(12) United States Patent
Lee

(10) Patent No.: US 10,348,209 B2
(45) Date of Patent: Jul. 9, 2019

(54) OUTPUT VOLTAGE RESPONSIVE ISOLATED DC TO DC CONVERTER IN FULL AND HALF BRIDGE MODES

(71) Applicant: WORLD TOPTEC CO., LTD., Bucheon-si, Gyeonggi-do (KR)

(72) Inventor: Dong-Hyang Lee, Bucheon-si (KR)

(73) Assignee: WORLD TOPTEC CO., LTD., Bucheon-si, Gyeonggi-do (KR)

( * ) Notice: Subject to any disclaimer, the term of this patent is extended or adjusted under 35 U.S.C. 154(b) by 0 days.

(21) Appl. No.: 15/764,776

(22) PCT Filed: Dec. 15, 2015

(86) PCT No.: PCT/KR2015/013717
§ 371 (c)(1),
(2) Date: Mar. 29, 2018

(87) PCT Pub. No.: WO2017/069333
PCT Pub. Date: Apr. 27, 2017

(65) Prior Publication Data
US 2018/0278163 A1    Sep. 27, 2018

(30) Foreign Application Priority Data

Oct. 22, 2015 (KR) .................. 10-2015-0147277

(51) Int. Cl.
*H02M 3/335* (2006.01)
*H02M 3/337* (2006.01)
(Continued)

(52) U.S. Cl.
CPC ......... *H02M 3/33507* (2013.01); *H02J 7/022* (2013.01); *H02M 3/3376* (2013.01);
(Continued)

(58) Field of Classification Search
CPC ............................................. H02M 3/335–42
See application file for complete search history.

(56) References Cited

U.S. PATENT DOCUMENTS

2002/0126515 A1    9/2002    Boeke
2015/0049515 A1    2/2015    Zhao et al.
(Continued)

FOREIGN PATENT DOCUMENTS

EP       2421141 A1       2/2012
KR    10-2014-0145830 A    12/2014
(Continued)

*Primary Examiner* — Gary L Laxton
*Assistant Examiner* — Peter M Novak
(74) *Attorney, Agent, or Firm* — Novick, Kim & Lee, PLLC; Jae Youn Kim

(57) ABSTRACT

Provided is a DC/DC converter which has a full bridge configured in a switching unit and uses a half bridge, which is subordinate to the full bridge in view of circuit configuration, to automatically select such one of the multi-topologies. More particularly, the DC/DC converter uses multi-topologies, which receives, in real time, feedback of an output voltage charged to a battery, operates using the half bridge when the output voltage charged to the battery is lower than a reference voltage, and operates using the full bridge when the output voltage charged to the battery is equal to or higher than the reference voltage, so as to output a wider range of voltage.

3 Claims, 9 Drawing Sheets

(51) Int. Cl.
*H02J 7/02* (2016.01)
*H02M 7/487* (2007.01)
*H02J 7/00* (2006.01)

(52) U.S. Cl.
CPC ....... *H02M 3/33569* (2013.01); *H02J 7/0052* (2013.01); *H02M 7/487* (2013.01)

(56) References Cited

U.S. PATENT DOCUMENTS

2015/0062971 A1* 3/2015 Ye .................... H02M 3/33569
363/17
2016/0329811 A1* 11/2016 Du .................... H02M 3/1584

FOREIGN PATENT DOCUMENTS

| KR | 10-1548528 B1 | 9/2015 |
| WO | 2014-088551 A2 | 6/2014 |

\* cited by examiner

OUTPUT VOLTAGE RESPONSIVE ISOLATED DC TO DC CONVERTER IN FULL AND HALF BRIDGE MODES

TECHNICAL FIELD

The present invention relates to a DC-to-DC (DC/DC) converter which has a 3-level full bridge configured in a switching unit and uses a half bridge, which is subordinate to the full bridge in view of circuit configuration, to automatically select such one of the multi-topologies. More particularly, the present invention relates to a DC/DC converter using multi-topologies, which receives, in real time, feedback of an output voltage charged to a battery, operates using the half bridge when the output voltage charged to the battery is lower than a reference voltage, and operates using the full bridge when the output voltage charged to the battery is equal to or higher than the reference voltage, so as to output a wider range of voltage.

BACKGROUND ART

When supplying energy to electronic circuits which require relatively high output, DC/DC converters should increase their output voltage to be utilized in specific applications Dependent upon the load, the DC/DC converter may need to slowly decrease the output voltage. For this, a DC/DC converter is one of various voltage-lowering and voltage-boosting converters.

Meanwhile, currently, along with a tendency for worldwide Green Growth Policy, electronic vehicles (EV) represents a future converging technology to which there is a growing attention from not only international organizations but also governments and enterprises in each country.

Provided with electric power from outside and charging to a battery, such electronic vehicles obtain power, which is mechanical energy, using voltage charged to the battery. As an apparatus for providing the voltage which electronic vehicles require for charging low voltage and high voltage, a charger for vehicles needs a DC/DC converter which enables to provide outputs of a wide voltage range of direct current power source from direct current input power source by using a single output circuit.

Such DC/DC converter has been disclosed in Korean Registration Patent no. 10-1548528 (DC/DC converter).

The DC/DC converter comprises a switching unit for switching direct current input power source alternately; a voltage transformer for converting power source switched by the switching unit, containing a single trans which includes a primary winding and a secondary winding, converting the power source inputted in the primary winding, and outputting to the secondary winding; a rectification unit for rectifying alternating current power supply, outputted in the secondary winding of the voltage transformer, to direct current power source, containing a switching element and first to fourth diodes, and operating using a high voltage mode or a low voltage mode in accordance with operation of the switching element; and an output filter for filtering power source outputted from the rectification unit, wherein the rectification unit refers to a bridge rectification circuit which comprises, in the high voltage mode, the first diode and the second diode each connected in forward direction to both ends of the secondary winding of the voltage transformer, and the third diode and the fourth diode each connected in reverse direction to both ends of the secondary winding of the voltage transformer; wherein the rectification unit refers to a center-tapped rectification circuit which comprises, in the low voltage mode, the first diode and the second diode each connected in forward direction to both ends of the secondary winding of the voltage transformer, and a center tap formed in the secondary winding of the voltage transformer and connected to a connection terminal; and wherein the switching element of the rectification unit includes a first switch which turns on/off between the center tap and the connection terminal and a second switch which turns on/off between negative poles of the third diode and the fourth diode and the connection terminal; and wherein the first switch turns off in the high voltage mode and turns on in the low voltage mode and the second switch turns on in the high voltage mode and turns off in the low voltage mode.

Further, the DC/DC converter consists of a full-bridge converter, or a half-bridge converter, or a push-pull circuit to generate alternating voltage with input DC voltage switched alternately.

However, the DC/DC converter halves a number of the secondary winding of a trans and uses depending on a size of an output voltage for supplying outputs of a wide voltage range, i.e., using the secondary winding as one winding as for low output voltage, and the secondary winding of the trans as two windings in series as for high voltage. There is a current, which requires for output, flowing in the winding and thus, the current constantly flows even as for using one trans winding and two trans windings in series. Thus, there needs to select a diameter of the winding for allowing two windings in the maximum output current. At this time, there is a problem that a size of the trans becomes large for obtaining a space to coil up two windings as compared to using thick winding as a single winding.

In addition, upon high voltage output, two windings of the trans are connected in series, thereby applying double higher voltage rating to the second diode and requiring to use high voltage rating of diode. There is a problem that high pressure resistant diode has high voltage forward (VF), thereby incurring loss.

Furthermore, in the common quick charger, high voltage and current are generated when charging with a high capacity, and loss is reduced in case that current is smaller than voltage. Thus, it needs to increase voltage for flowing small current. In general circuit methods, in case for applying high voltage so as to reduce current, it is not possible to use general MOSFET with available cost and supply, because high voltage is generated in the switch element, and there is a problem that loss is incurred due to large current flow when reducing input voltage so as to use MOSFET.

PRIOR ART

Reference (Patent document) Korean Patent Registration No. 10-1548528

DETAILED DESCRIPTION

Technical Problem

For solving the above problems, the present disclosure provides a DC/DC converter which has a full bridge configured in a switching unit and uses a half bridge, which is subordinate to the full bridge in view of circuit configuration, to automatically select such one of the multi-topologies. More particularly, the present disclosure relates to a DC/DC converter using multi-topologies, which receives feedback of an output voltage charged to a battery, operates using the half bridge when the output voltage charged to the battery is lower than a reference voltage, and operates using the full bridge when the output voltage charged to the battery is equal to or higher than the reference voltage, so as to output a wider range of voltage.

Technical Solution

To accomplish the above objects, the present disclosure comprises: a first switching unit having a 3-level half bridge, for applying a current by switching direct current input power source alternately; a second switching unit having a 3-level half bridge in the rear of the first switching unit, for applying the current by switching the direct current input power source alternately; a transformer wherein one end is connected to the first switching unit and the other end is connected to the second switching unit, thereby applying the current, applied in accordance with switching operation of the first and second switching units, to the primary winding and then, being induced in the secondary winding to output alternating current power supply; a rectification unit for outputting an output voltage by rectifying alternating current power supply, which is outputted in the secondary winding of the transformer, to direct current power source; and a controller for receiving, in real time, feedback of the output voltage charged to a battery, charging the battery by operating the first and second switching units using a half bridge mode when the output voltage charged to the battery is lower than a reference value, and controlling to operate the first and second switching units using a full bridge mode when the output voltage is equal to or higher than the reference value, so as to charge the battery.

Here, the DC/DC converter further comprises an input capacitor unit for connecting to the direct current input power source between the direct current input power source and the first switching unit and including first and second capacitors for halving power source; and a filter unit for including a first inductor and a third capacitor so as to filter the output voltage of the rectification unit.

Here, the first switching unit comprises a first MOSFET in which drain is connected to positive terminal of the direct current input power source and source is connected to negative terminal of the direct current input power source; a second MOSFET in which the drain and source are connected to the source of the first MOSFET; a third MOSFET in which the drain and source are connected to the source of the second MOSFET; and a fourth MOSFET in which the drain and source are connected to the source of the third MOSFET.

Here, the first switching unit includes first and second circulation diodes between the source of the first MOSFET and the drain of the second MOSFET and between the source of the third MOSFET and the drain of the fourth MOSFET, and it is connected in circuit relation between the first and second circulation diodes and between the first and second capacitors of the input capacitor.

Here, the second switching unit comprises a fifth MOSFET in which the drain is connected to the positive terminal of the direct current input power source and the source is connected to the negative terminal of the direct current input power source; a sixth MOSFET in which the drain and source are connected to the source of the fifth MOSFET; a seventh MOSFET in which the drain and source are connected to the source of the sixth MOSFET; and an eighth MOSFET in which the drain and source are connected to the source of the seventh MOSFET.

Here, the second switching unit includes third and fourth circulation diodes between the source of the fifth MOSFET and the drain of the sixth MOSFET and between the source of the seventh MOSFET and the drain of the eighth MOSFET, and it is connected in circuit relation between the third and fourth circulation diodes and between the first and circulation diodes.

Here, the controller generates a pulse signal with constant pulse period (Ts) by determining duty of the first and fourth MOSFETs during the half bridge mode in accordance with the output voltage charged to the battery, so as to turn on/off the first and fourth MOSFETs in order; generates the pulse signal by determining duty of the second, third, sixth and seventh MOSFETs to "0.5", pulse period (Ts), so as to turn on/off the second and seventh MOSFETs and the third and sixth MOSFETs in order; and makes current flow through the primary winding of the transformer by determining duty of the fifth and eighth MOSFETs to "0" and generating a turning on/off pulse signal and switching in accordance with the pulse signal.

Here, the controller generates the pulse signal with constant pulse period (Ts) by determining duty of the first, fourth, fifth and eighth MOSFETs during the full bridge mode in accordance with the output voltage charged to the battery, so as to turn on/off the first and eighth MOSFETs and the fourth and fifth MOSFETs in order, and makes current flow through the primary winding of the transformer by determining duty of the second, third, sixth and seventh MOSFETs to "0.5" of the pulse period (Ts), generating the pulse signal to turn on/off the second and seventh MOSFETs and the third and sixth MOSFETs in order, and switching in accordance with the pulse signal.

Here, the rectification unit refers to a bridge rectifier which consists of a fifth diode and a sixth diode each connected in forward direction to both ends of the secondary winding of the transformer; and a seventh diode and an eighth diode each connected in reverse direction to both ends of the secondary winding of the transformer.

Advantageous Effects

According to the DC/DC converter using the multi-topologies of the present disclosure, it has a 3-level full bridge configured in a switching unit and uses a half bridge, which is subordinate to the full bridge in view of circuit configuration, to automatically select such one of the multi-topologies and more particularly, it receives feedback of an output voltage charged to a battery, operates using the half bridge when the output voltage charged to the battery is lower than a reference voltage, and operates using the full bridge when the output voltage charged to the battery is equal to or higher than the reference voltage, so as to output a wider range of voltage, thereby enabling to reduce manu-facturing cost due to MOSFET and prevent loss incurrence.

DESCRIPTION OF PREFERRED EMBODIMENTS

The configuration of a DC/DC converter using multi-topologies of the present disclosure will be described in detail with the accompanying drawings.

In the following description of the present disclosure, a detailed description of known incorporated functions and configurations will be omitted when including them would make the subject matter of the present disclosure rather unclear. Also, the terms used in the following description are defined taking into consideration the functions provided in the present disclosure. The definitions of these terms should be determined based on the whole content of this specification because they may be changed in accordance with the option of a user or operator or a usual practice.

Figure 1:
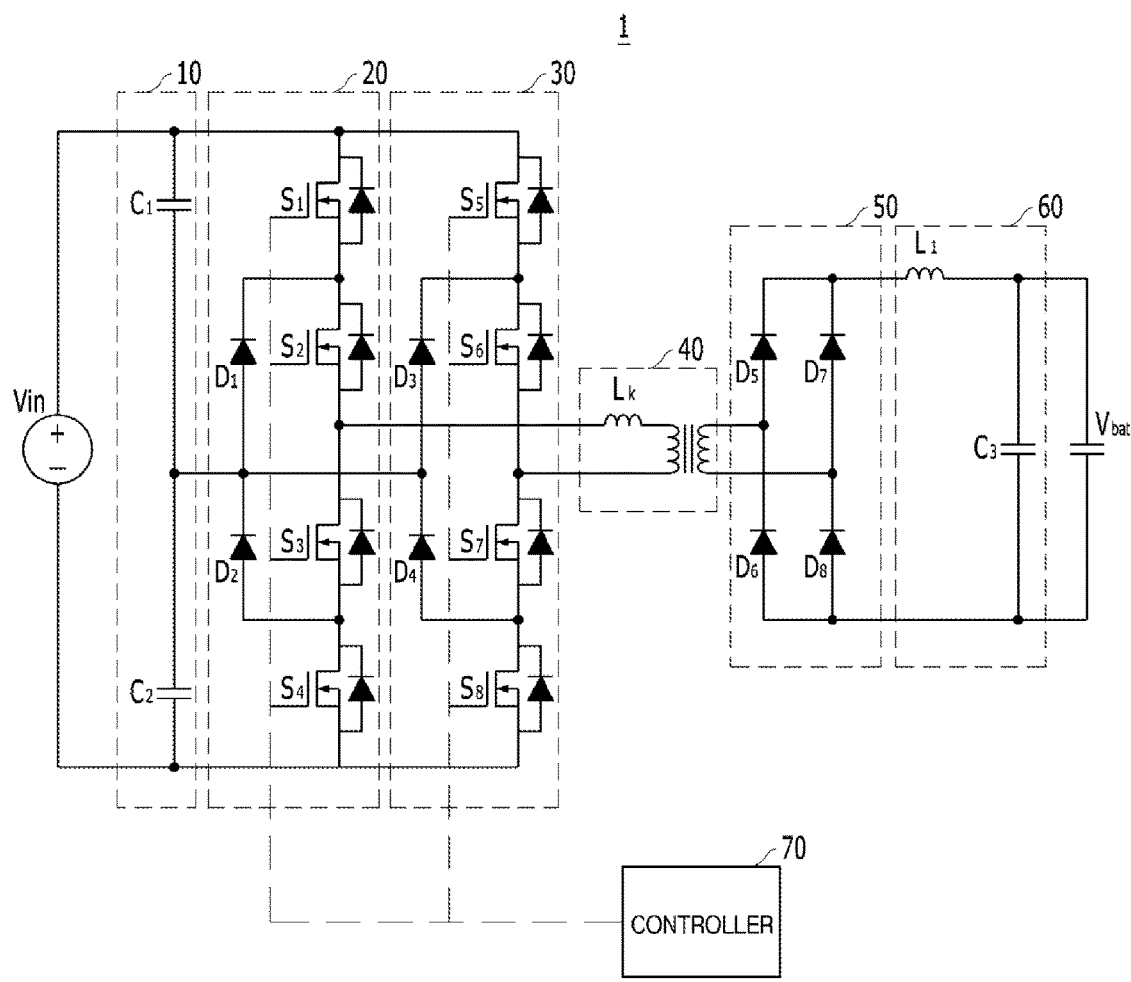
FIG. 1 illustrates a circuit diagram showing a high-level block diagram of a DC/DC converter using multi-topologies according to the present disclosure.

FIG. 1 illustrates a circuit diagram showing a high-level block diagram of a DC/DC converter using multi-topologies according to the present disclosure.

Referring to FIG. 1, the DC/DC converter (1) using multi-topologies according to the present disclosure comprises an input capacitor unit (10), a first switching unit (20), a second switching unit (30), a transformer (40), a rectification unit (50), a filter unit (60) and a controller (70).

First, in the input capacitor unit (10) connected to direct current input power source (Vin, for example 750V) between the direct current input power source (Vin) and the first switching unit (20), first and second capacitors (C1, C2) are connected in series for halving power source.

Further, having a 3-level half bridge, the first switching unit (20) applies current by switching the direct current input power source (Vin) alternately.

At this time, the first switching unit (20) comprises a first MOSFET (S1) in which drain is connected to positive terminal of the direct current input power source and source is connected to negative terminal of the direct current input power source, a second MOSFET (S2) in which the drain and source are connected to the source of the first MOSFET (S1), a third MOSFET (S3) in which the drain and source are connected to the source of the second MOSFET (S2), and a fourth MOSFET (S4) in which the drain and source are connected to the source of the third MOSFET (S3).

Further, the first switching unit (20) includes first and second circulation diodes (D1, D2) between the source of the first MOSFET (S1) and the drain of the second MOSFET (S2) and between the source of the third MOSFET (S3) and the drain of the fourth MOSFET (S4), and it is connected in circuit relation between the first and second circulation diodes (D1, D2) and between the first and second capacitors (C1, C2) of the input capacitor (10).

Further, having the 3-level half bridge like the first switching unit (20), the second switching unit (30) applies a current by switching the direct current input power source (Vin) alternately in the rear of the first switching unit (20).

At this time, the second switching unit (30) comprises a fifth MOSFET (S5) in which the drain is connected to the positive terminal of the direct current input power source (Vin) and the source is connected to the negative terminal of the direct current input power source, a sixth MOSFET (S6) in which the drain and source are connected to the source of the fifth MOSFET (S5), a seventh MOSFET (S7) in which the drain and source are connected to the source of the sixth MOSFET (S6), and an eighth MOSFET (S8) in which the drain and source are connected to the source of the seventh MOSFET (S7).

Further, the second switching unit (30) includes third and fourth circulation diodes (D3, D4) between the source of the fifth MOSFET (S5) and the drain of the sixth MOSFET (S6) and between the source of the seventh MOSFET (S7) and the drain of the eighth MOSFET (S8), and it is connected in circuit relation between the third and fourth circulation diodes (D3, D4) and between the first and circulation diodes (D1, D2).

Further, the transformer (40) includes a primary winding and a secondary winding, wherein one end of the primary winding is connected to the first switching unit (20) and the other end is connected to the second switching unit (30), thereby applying a current, applied in accordance with switching operation of the first and second switching units (20, 30), to the primary winding and then, being induced in the secondary winding to output alternating current power supply.

Further, the rectification unit (50) outputs an output voltage by rectifying the alternating current power supply, which is outputted in the secondary winding of the transformer (40), to direct current power source.

At this time, the rectification unit (50) refers to a bridge rectifier which consists of a fifth diode (D5) and a sixth diode (D6) each connected in forward direction to both ends of the secondary winding of the transformer (40), and a seventh diode (D7) and a eighth diode (D8) each connected in reverse direction to both ends of the secondary winding of the transformer (40).

Furthermore, the filter unit (60) includes a first inductor (L1) and a third capacitor (C3), for filtering the output voltage of the rectification unit (50).

In addition, the controller (70) receives, in real time, feedback of the output voltage charged to a battery, charges the battery (Vbatt) by operating the first and second switching units (20, 30) using a half bridge mode when the output voltage charged to the battery is lower than a reference value, and controls to operate the first and second switching units (20, 30) using a full bridge mode when the output voltage charged to the battery is equal to or higher than the reference value, so as to charge the battery (Vbatt).

Here, the controller (70) generates a pulse signal with constant pulse period (Ts) by determining duty of the first and fourth MOSFETs (S1, S4) during the half bridge mode in accordance with the output voltage charged to the battery, so as to turn on/off the first and fourth MOSFETs (S1, S4) in order, generates the pulse signal by determining duty of the second, third, sixth and seventh MOSFETs (S2, S3, S6, S7) to "0.5", pulse period (Ts), so as to turn on/off the second and seventh MOSFETs (S2, S7) and the third and sixth MOSFETs (S3, S6) in order, and makes a current flow through the primary winding of the transformer (40) by determining duty of the fifth and eighth MOSFETs (S5, S8) to "0" and turning off, i.e., generating a non-operated pulse signal and switching in accordance with the pulse signal.

Here, the controller (70) generates the pulse signal with constant pulse period (Ts) by determining duty of the first, fourth, fifth and eighth MOSFETs (S1, S4, S5, S8) during the full bridge mode in accordance with the output voltage charged to the battery, so as to turn on/off the first and eighth MOSFETs (S1, S8) and the fourth and fifth MOSFETs (S4, S5) in order, and makes a current flow through the primary winding of the transformer (40) by determining duty of the second, third, sixth and seventh MOSFETs (S2, S3, S6, S7) to "0.5" of the pulse period (Ts), generating the pulse signal to turn on/off the second and seventh MOSFETs (S2, S7) and the third and sixth MOSFETs (S3, S6) in order, and switching in accordance with the pulse signal.

Furthermore, the controller (70) detects the output voltage charged to the battery and an output current charged to the battery, thereby constantly controlling the charged voltage and the charged current.

Hereinafter, the operation for the DC/DC converter using multi-topologies according to the present disclosure will be described in detail with the accompanying drawing.

FIGS. 2A to 2D illustrate circuit diagrams and waveform diagrams for explaining operation during a half-bridge mode of the DC/DC converter using multi-topologies according to the present disclosure, and FIGS. 3A to 3D illustrate circuit diagrams and waveform diagrams for explaining operation during a full-bridge mode of the DC/DC converter using multi-topologies according to the present disclosure.

First, the controller (70) receives, in real time, feedback of the output voltage charged to the battery, and controls to charge the battery (Vbatt) by operating the first and second switching units (20, 30) using the half bridge mode when the output voltage charged to the battery is lower than a reference value (for example, 250V, an output voltage range of 50-250V).

Figure 2A:
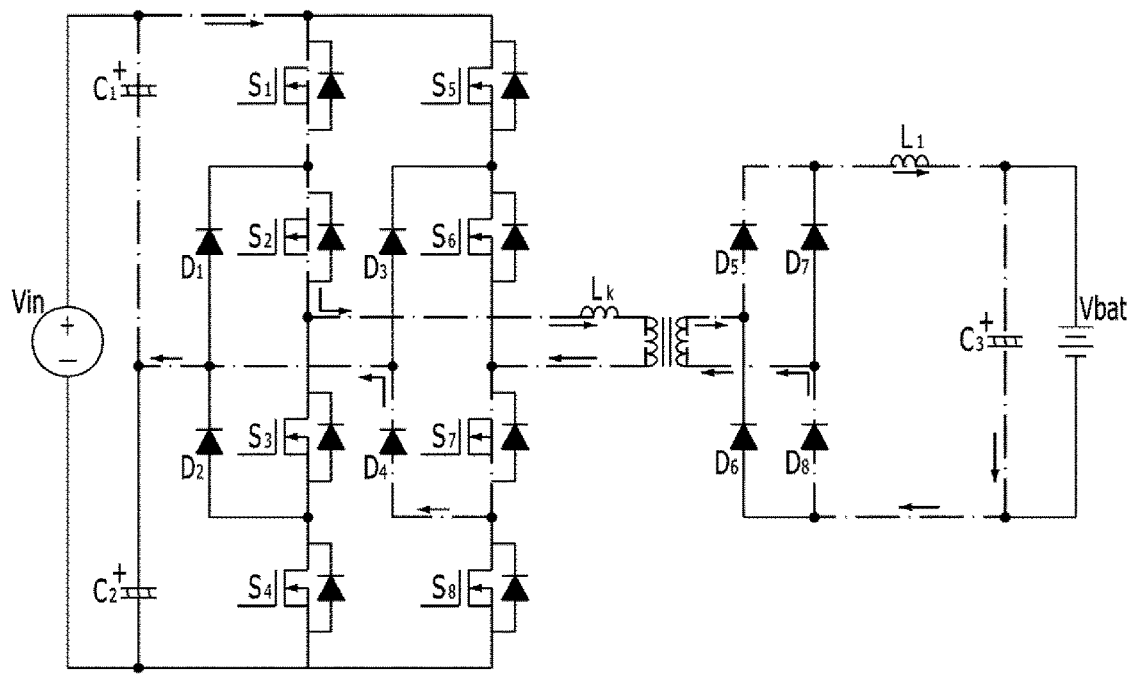
FIGS. 2A to 2D illustrate circuit diagrams and waveform diagrams for explaining operation during a half-bridge mode of the DC/DC converter using multi-topologies according to the present disclosure.
Figure 2A:
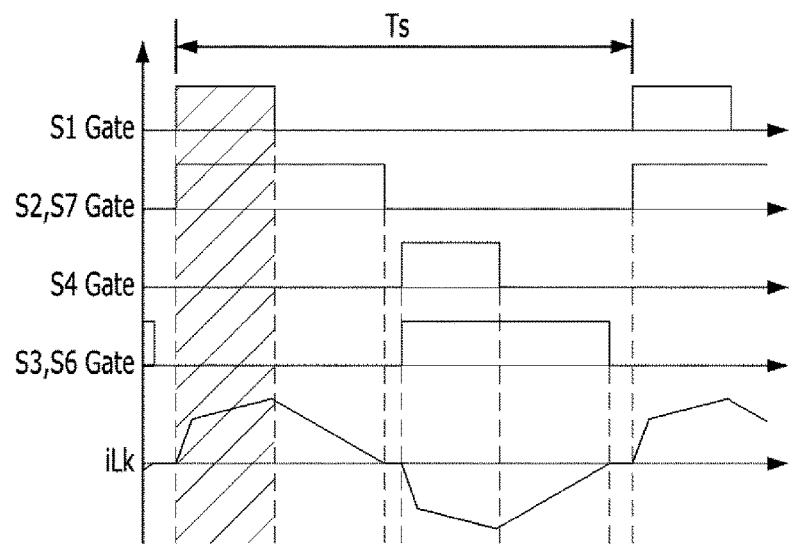

That is, as illustrated in FIG. 2A, the controller (70) outputs the pulse signal to a gate of the first, second and seventh MOSFETs (S1, S2, S7) and turns on, thereby making the direct current output power source, halved in the first capacitor (C1) of the input capacitor unit (10), flow to positive terminal of the first capacitor (C1), the first and second MOSFETs (S1, S2), the primary winding of the transformer (40), the seventh MOSFET (S7) and negative terminal of the first capacitor (C1).

Then, a positive current is induced in the secondary winding of the transformer (40) and then, alternating voltage is generated, thereby charging to the battery (Vbatt) due to direct current voltage converted through the rectification unit (50) and the filter unit (60).

Figure 2B:
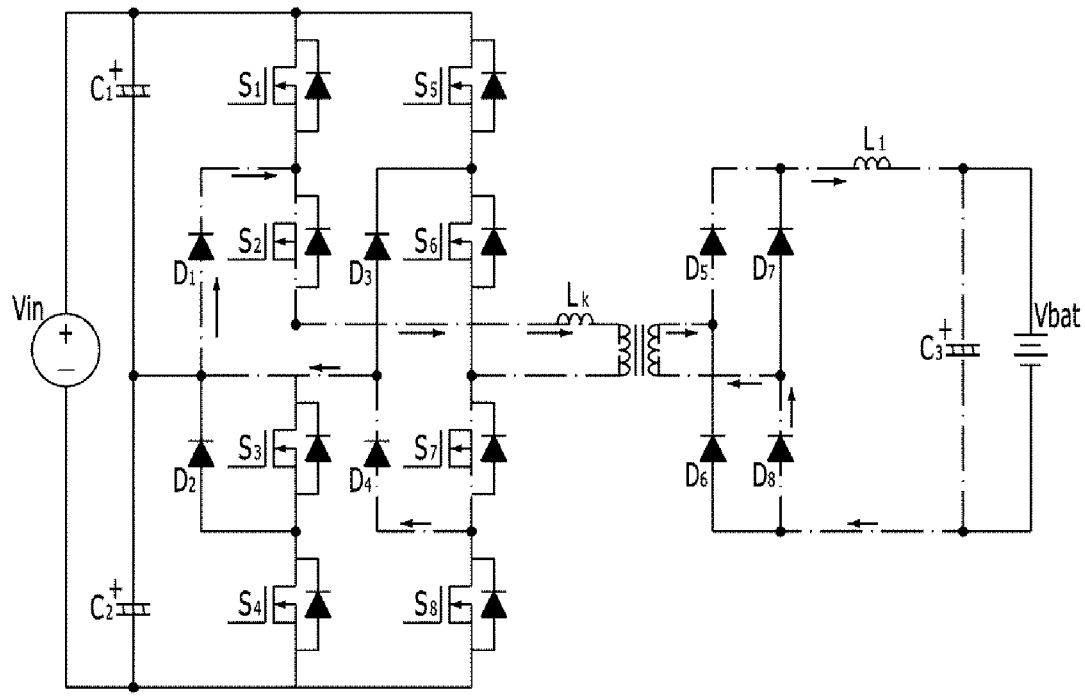
Figure 2B:
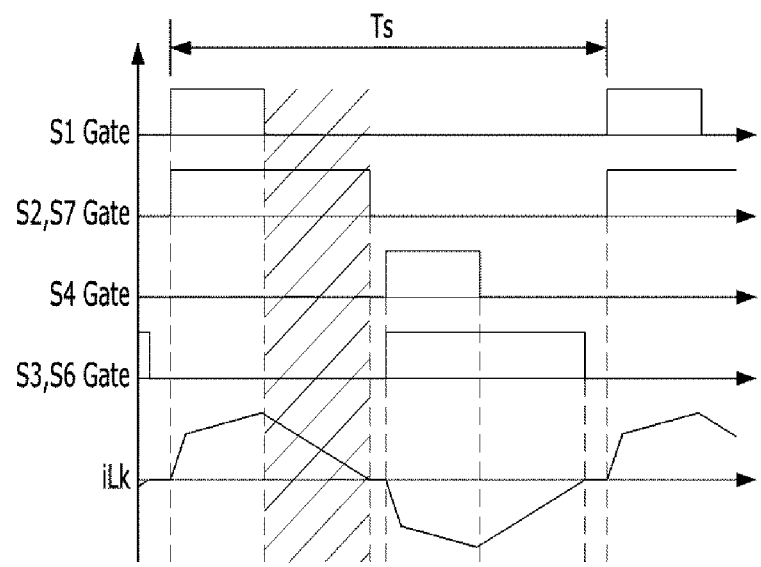

Further, as illustrated in FIG. 2B, when the first MOSFET (S1) turns off, remaining current in the primary winding of the transformer (40) is circulated in the seventh MOSFET (S7), the fourth and first rectification diodes (D4, D1), the second MOSFET (S2) and the primary winding of the transformer (40), again, and is vanished.

Figure 2C:
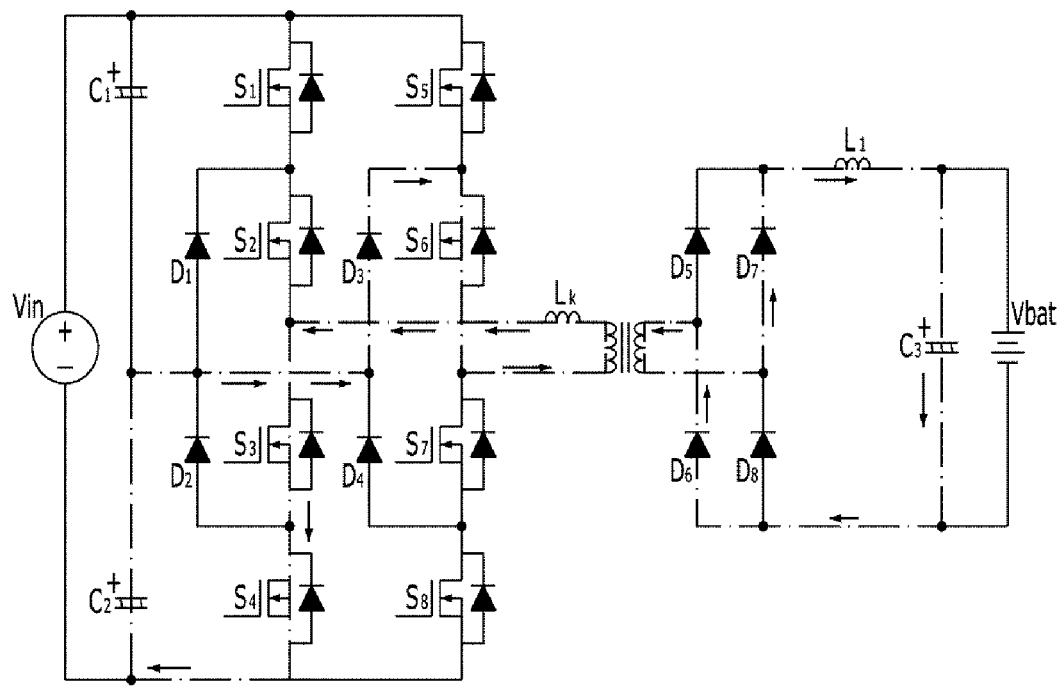
Figure 2C:
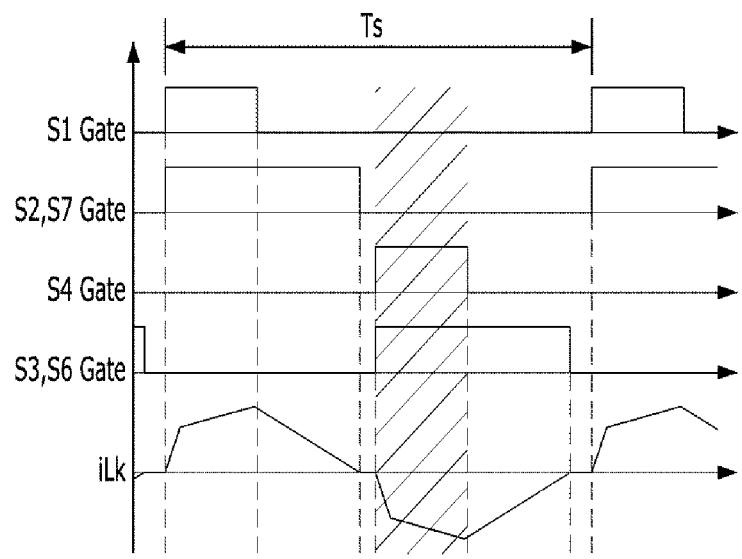

And, as illustrated in FIG. 2C, when the second and seventh MOSFETs (S2, S7) turn off and the fourth MOSFET (S4), the third and sixth MOSFETs (S3, S6) turn on according to the controller (70), the current of direct current input power source which is halved in the second capacitor (C1) of the input capacitor unit (10) is applied in reverse direction to the primary winding of the transformer (40) through positive terminal of the second capacitor (C2), the third circulation diode (D3) and the sixth MOSFET (S6) and then, is flowed to the third and fourth MOSFETs (S3, S4) and negative terminal of the second capacitor (C2).

Then, a positive current is induced in the secondary winding of the transformer (40) and then, alternating voltage is generated, thereby charging to the battery (Vbatt) due to direct current voltage converted through the rectification unit (50) and the filter unit (60).

Figure 2D:
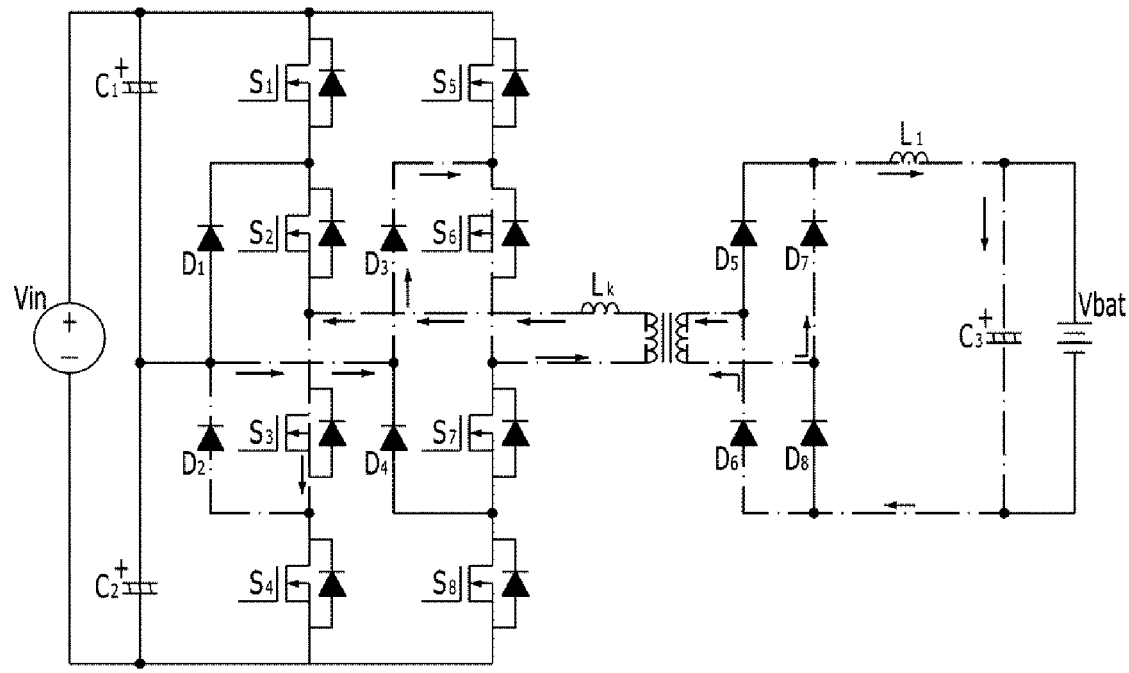
Figure 2D:
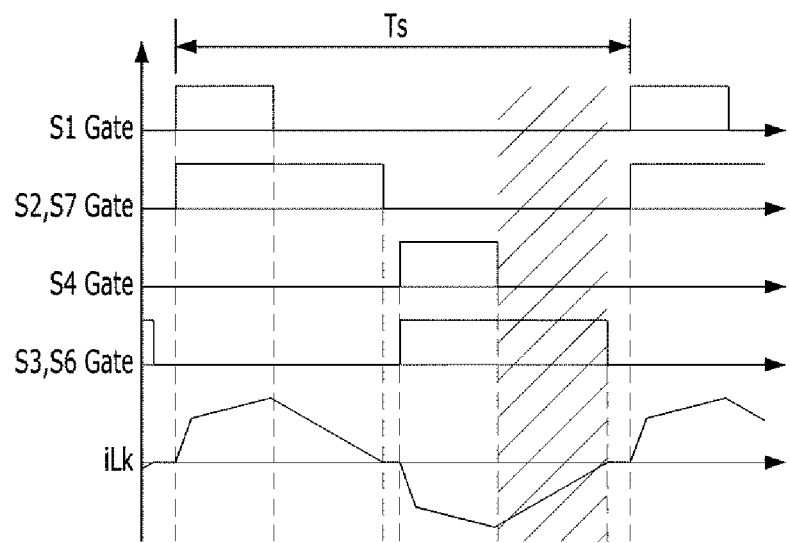

Further, as illustrated in FIG. 2D, when the fourth MOSFET (S4) turns off, remaining current in the primary winding of the transformer (40) is circulated in the third MOSFET (S3), the second and third rectification diodes (D2, D3), the sixth MOSFET (S6) and the primary winding of the transformer (40), again, and is vanished.

Further, the controller (70) repeats processes described in FIGS. 2A-2D, again.

In such condition, when the output voltage charged to the battery is equal to or higher than the reference value (for example, 250V, an output voltage range of 251-500V), the controller (70) converts the first and second switching units (20, 30), operated using the half bridge mode, to the full bridge, and charges to the battery (Vbatt).

Figure 3A:
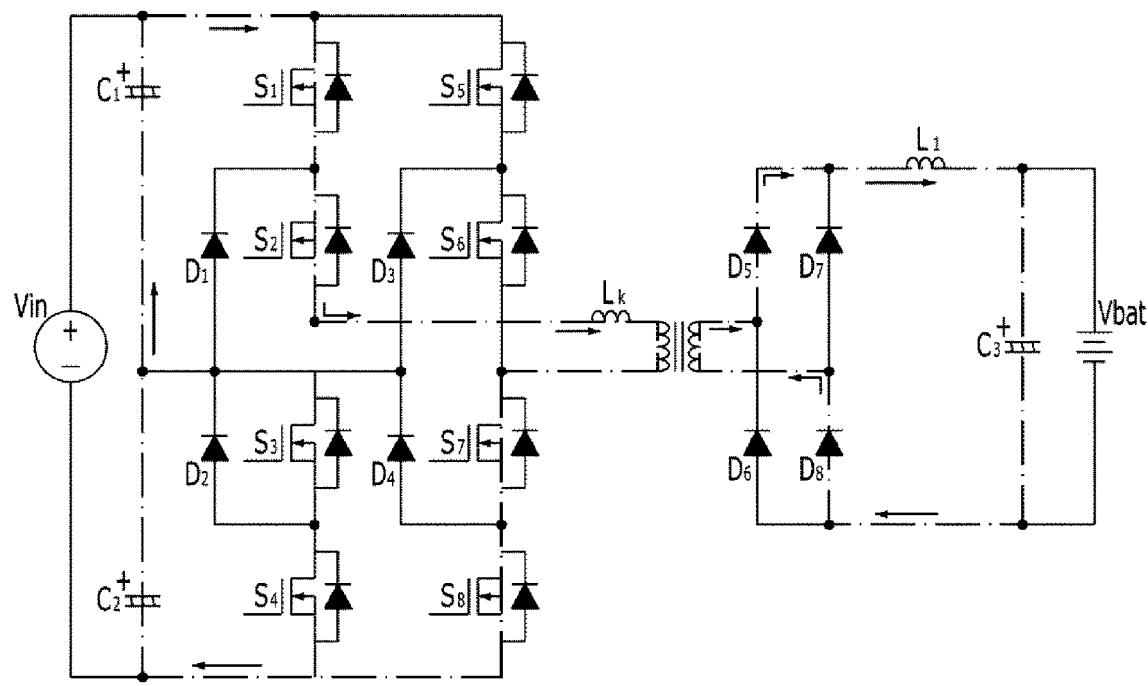
FIGS. 3A to 3D illustrate circuit diagrams and waveform diagrams for explaining operation during a full-bridge mode of the DC/DC converter using multi-topologies according to the present disclosure.
Figure 3A:
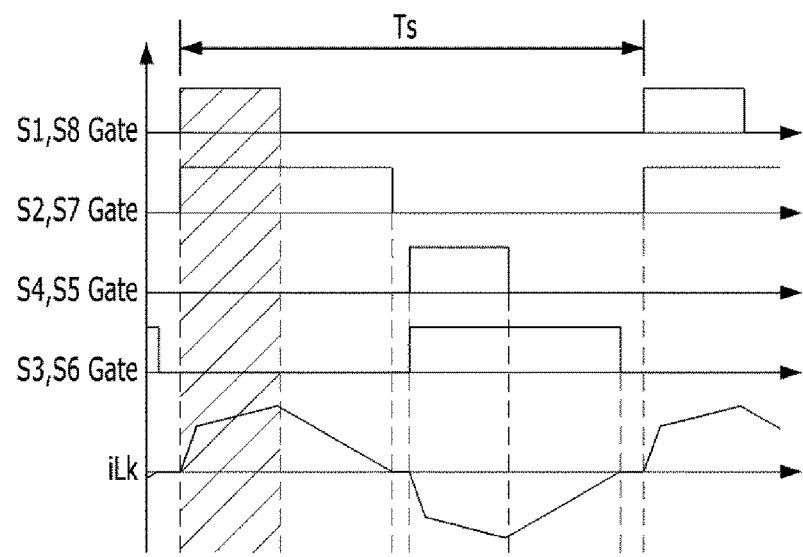

That is, as illustrated in FIG. 3A, the controller (70) outputs the pulse signal to a gate of the first, second, seventh and eighth MOSFETs (S1, S2, S7, S8) and turns on, thereby making the direct current output power source flow to the positive terminal of the first capacitor (C1), the first and second MOSFETs (S1, S2), the primary winding of the transformer (40), the seventh and eighth MOSFETs (S7, S8) and the negative terminal of the second capacitor (C1).

Then, a positive current is induced in the secondary winding of the transformer (40) and then, alternating voltage is generated, thereby charging to the battery (Vbatt) due to direct current voltage converted through the rectification unit (50) and the filter unit (60).

Figure 3B:
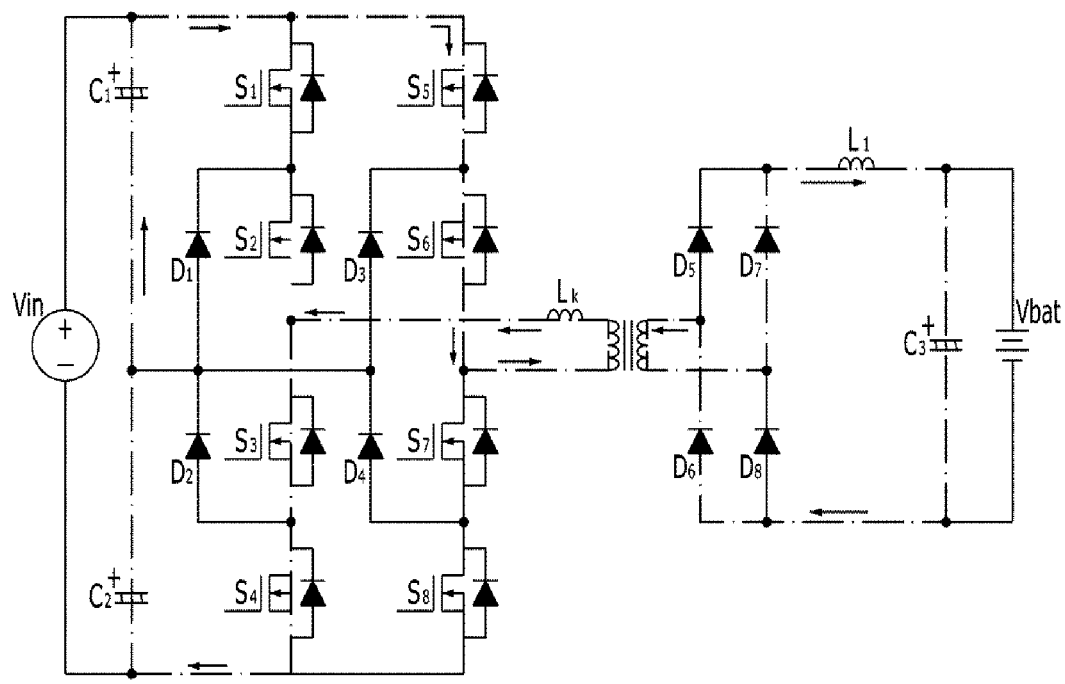
Figure 3B:
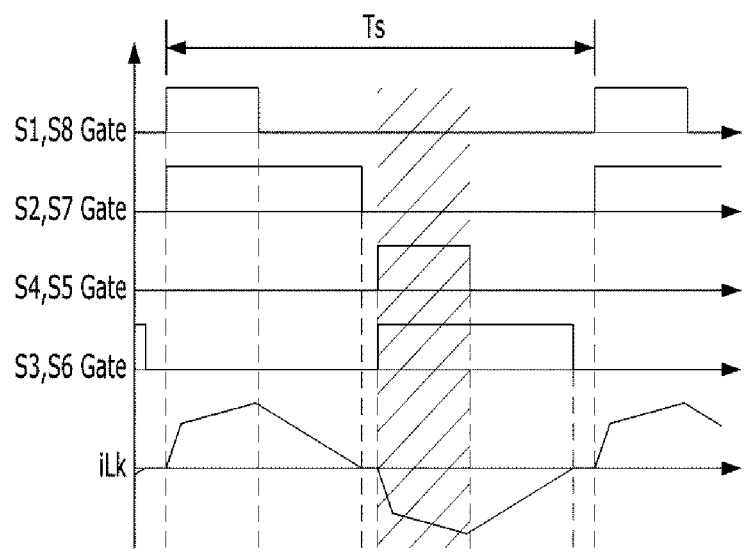

Further, as illustrated in FIG. 3B, when the first and eighth MOSFETs (S1, S8) turn off, remaining current in the primary winding of the transformer (40) is circulated in the seventh MOSFET (S7), the fourth and first rectification diodes (D4, D1), the second MOSFET (S2) and the primary winding of the transformer (40), again, and is vanished.

Figure 3C:
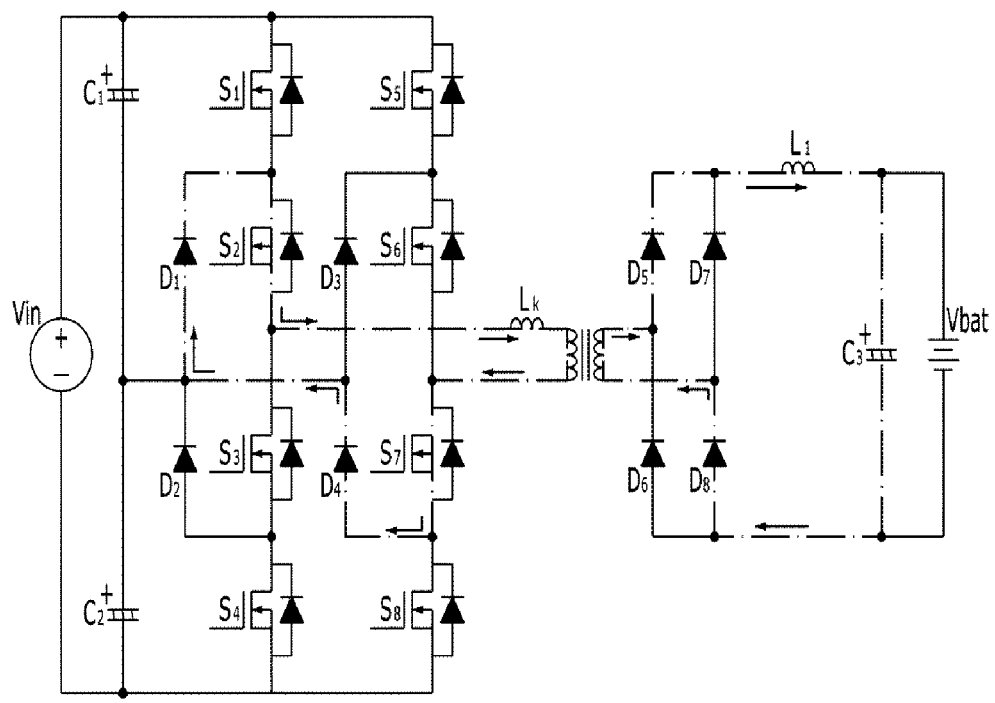
Figure 3C:
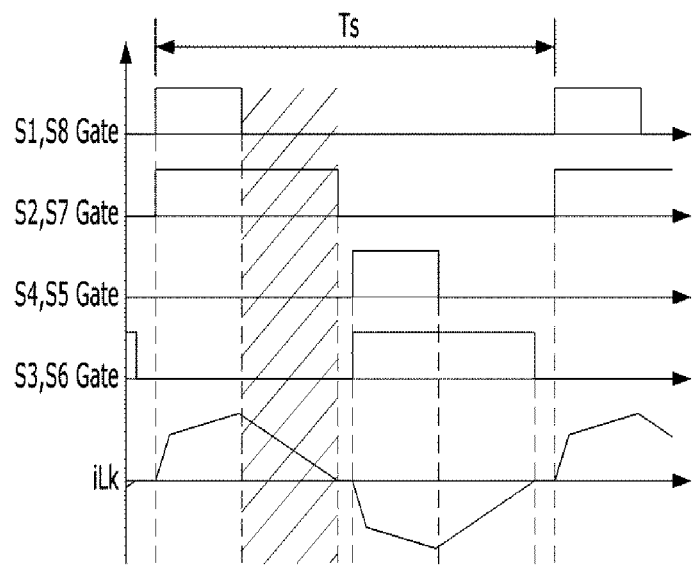

Further, as illustrated in FIG. 3C, when the second and seventh MOSFETs (S2, S7) turn off and the fourth and fifth MOSFETs (S4, S5) and the third and sixth MOSFETs (S3, S6) turn on according to the controller (70), the current of direct current input power source is applied in reverse direction to through the positive terminal of the first capacitor (C2), the fifth and sixth MOSFETs (S5, S6) and the primary winding of the transformer (40) and then, is flowed to the third and fourth MOSFETs (S3, S4) and the negative terminal of the second capacitor (C2).

Then, a positive current is induced in the secondary winding of the transformer (40) and then, alternating voltage is generated, thereby charging to the battery (Vbatt) due to direct current voltage converted through the rectification unit (50) and the filter unit (60).

Figure 3D:
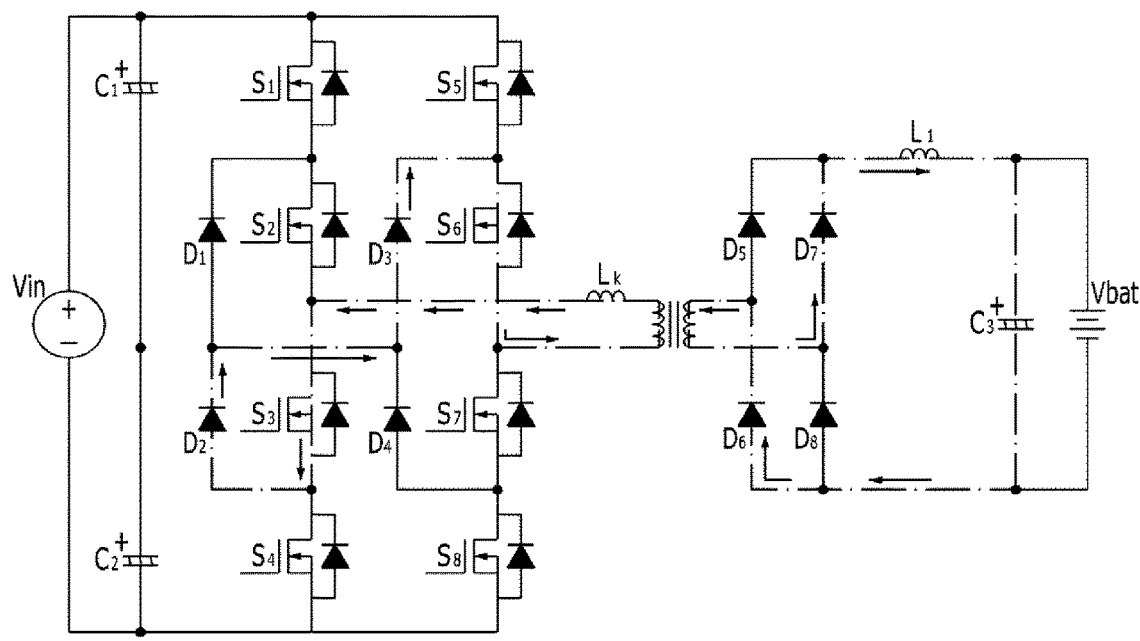
Figure 3D:
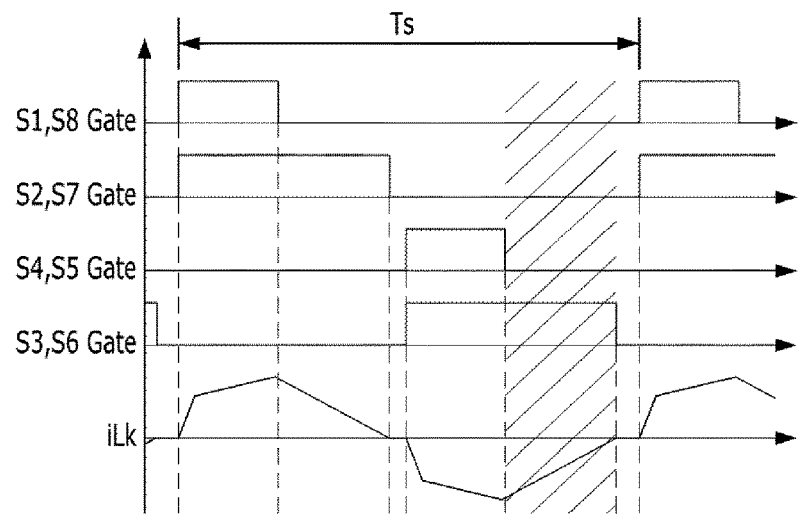

Further, as illustrated in FIG. 3D, when the fourth and fifth MOSFETs (S4, S5) turn off, remaining current in the primary winding of the transformer (40) is circulated in the third MOSFET (S3), the second and third rectification diodes (D2, D3), the sixth MOSFET (S6) and the primary winding of the transformer (40), again, and is vanished.

Further, the controller (70) repeats processes described in FIGS. 3A-3D, again.

Furthermore, operated to the full bridge mode, the controller (70) is operated to the half bridge mode again when the output voltage charged to the battery is lower than a reference value (for example, 250V).

Although the preferred embodiments of the present disclosure have been disclosed for illustrative purposes, those skilled in the art will appreciate that various modifications, additions and substitutions are possible, without departing from the scope and spirit of the invention as disclosed in the accompanying claims.

| <Explanations of numeral reference> | |
| --- | --- |
| 10: input capacitor unit | 20, 30: first and second switching units |
| 40: transformer | 50: rectification unit |
| 60: filter unit | 70: controller |

The invention claimed is:

1. A DC/DC converter comprising:

a first switching circuit having a first 3-level half bridge for applying a current by switching a direct current input power source alternately, wherein the first switching circuit comprises a first MOSFET in which a drain of the first MOSFET is connected to a positive terminal of the direct current input power source and a source of the first MOSFET is connected to a negative terminal of the direct current input power source, a second MOSFET in which a drain and a source of the second MOSFET are connected to the source of the first MOSFET, a third MOSFET in which a drain and a source of the third MOSFET are connected to the source of the second MOSFET, a fourth MOSFET in which a drain and a source of the fourth MOSFET are connected to the source of the third MOSFET, a first circulation diode connected to a point between the source of the first MOSFET and the drain of the second MOSFET, and a second circulation diode connected to a point between the source of the third MOSFET and the drain of the fourth MOSFET;

a second switching circuit having a second 3-level half bridge, wherein the first switching circuit and the second switching circuit form a full-bridge, wherein the full-bridge applies the current by switching the direct current input power source alternately, wherein the second switching circuit comprises a fifth MOSFET in which a drain of the fifth MOSFET is connected to a positive terminal of the direct current input power source and a source of the fifth MOSFET is connected to a negative terminal of the direct current input power source, a sixth MOSFET in which a drain and a source of the sixth MOSFET are connected to the source of the fifth MOSFET, a seventh MOSFET in which a drain and a source of the seventh MOSFET are connected to the source of the sixth MOSFET, an eighth MOSFET in which a drain and a source of the eighth MOSFET are connected to the source of the seventh MOSFET, a third circulation diode connected to a point between the source of the fifth MOSFET and the drain of the sixth MOSFET, and a fourth circulation diode connected to a point between the source of the seventh MOSFET and the drain of the eighth MOSFET;

an input capacitor circuit connected to the direct current input power source, disposed between the direct current input power source and the first switching circuit, and including first and second capacitors for halving the direct current input power source, wherein a point between the first and second circulation diodes is connected to a point between the first and second capacitors of the input capacitor circuit, wherein a point between the third and fourth circulation diodes is connected to a point between the first and circulation diodes;

a transformer, wherein one end of the transformer is connected to the first switching circuit and the other end of the transformer is connected to the second switching circuit, thereby applying the current, applied in accordance with switching operation of the first and second switching circuits, to a primary winding which causes a secondary winding to provide an alternating current power supply through induction;

a rectification circuit for outputting an output voltage after rectifying the alternating current power supply, provided by the secondary winding of the transformer, to create a direct current power source;

a filter circuit including a first inductor and a third capacitor so as to filter the output voltage of the rectification circuit; and a controller for charging a battery by operating the first and second switching circuits using a half bridge mode when the output voltage charged to the battery is lower than a reference value, and controlling to operate the first and second switching circuits using a full bridge mode when the output voltage is equal to or higher than the reference value, so as to charge the battery, wherein the controller generates a pulse signal with a constant pulse period (Ts) by determining a duty of the first and fourth MOSFETs during the half bridge mode in accordance with the output voltage charged to the battery so as to turn on/off the first and fourth MOSFETs consecutively, generates the pulse signal by determining a duty of the second, third, sixth and seventh MOSFETs as "0.5" of the pulse period (Ts) so as to turn on/off the second and seventh MOSFETs and the third and sixth MOSFETs consecutively, and makes current flow through the primary winding of the transformer by determining a duty of the fifth and eighth MOSFETs as "0" thereby generating a turning off pulse signal and switching in accordance with the pulse signal.

2. The DC/DC converter according to claim 1, wherein the controller generates the pulse signal with the constant pulse period (Ts) by determining a duty of the first, fourth, fifth and eighth MOSFETs during the full bridge mode in accordance with the output voltage charged to the battery, so as to turn on/off the first and eighth MOSFETs and the fourth and fifth MOSFETs consecutively; and makes current flow through the primary winding of the transformer by determining a duty of the second, third, sixth and seventh MOSFETs to "0.5" of the pulse period (Ts), generating the pulse signal to turn on/off the second and seventh MOSFETs and the third and sixth MOSFETs consecutively, and switching in accordance with the pulse signal.

3. The DC/DC converter according to claim 1, wherein the rectification circuit is a bridge rectifier comprising a fifth diode and a sixth diode each connected in forward direction to both ends of the secondary winding of the transformer; and a seventh diode and a eighth diode each connected in reverse direction to both ends of the secondary winding of the transformer.

* * * * *